March 24, 1970 R. D. DI STEFANO 3,502,555

SELECTIVE ETCHING OF CHROMIUM-SILICA LAMINATES

Filed June 8, 1967

INVENTOR

RALPH D. DISTEFANO

BY [signature]

ATTORNEY

United States Patent Office 3,502,555

Patented Mar. 24, 1970

3,502,555

SELECTIVE ETCHING OF CHROMIUM-SILICA LAMINATES

Ralph D. Di Stefano, Mercerville, N.J., assignor to RCA Corporation, a corporation of Delaware Filed June 8, 1967, Ser. No. 644,649
Int. Cl. H01l 7/56
U.S. Cl. 204—143 8 Claims

ABSTRACT OF THE DISCLOSURE

In the manufacture of thin film capacitors employing silica as the dielectric and chromium as the electrode material, the silica is pyrolytically deposited on the underlying chromium layer. At the elevated temperature at which the silica is deposited, a reaction occurs at the interface between the silica and chromium layers producing a transition layer including one or more chromium compounds which are extremely difficult to etch without dissolving portions of other layers which are to be retained. An electrolytic etching technique is employed for removal of this interface layer in which the laminate is immersed in a sodium hydroxide electrolyte and a potential applied between the electrolyte and the transition layer in order to remove selected portions of said transition layer.

BACKGROUND OF THE INVENTION

This invention relates to the selective etching of chromium-silica laminates and chromium oxide layers, and more particularly to an electrolytic technique for removing a selected portion of the laminate.

In the fabrication of thin film capacitors, it is common to employ silica as the dielectric material and chromium as the material for the adjacent electrodes, since chromium is known to adhere well to silica. Usually, a thin layer of chromium is deposited on a suitable base material, and the silica layer is deposited pyrolytically on the chromium by the vapor phase reaction of appropriate constituent substances. The pyrolytic deposition takes place at an elevated temperature, resulting in a reaction between said substances and the chromium and silica layers at the interface therebetween to form an etch resistant transition layer. It has heretofore been extremely difficult to selectively etch this transition layer without deteriorating portions of the thin film capacitor structure which are desired to be retained intact.

SUMMARY

According to this invention, there is provided an improved process for selectively etching chromium-silica laminates (and chromium oxide layers) wherein the transition layer formed at the chromium-silica interface during the deposition of the silica layer is selectively etched by immersing the portion of the transition layer to be removed in a suitable electrolytic solution and applying a predetermined potential difference between the solution and the selected transition layer portion.

IN THE DRAWINGS

DETAILED DESCRIPTION

Figure 1:
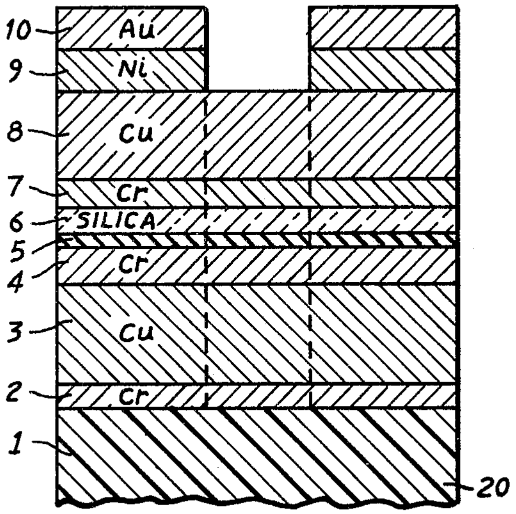
FIGURE 1 shows an intermediate step in the fabrication of a thin film capacitor.

FIGURE 1 shows a thin film capacitor in an intermediate stage of manufacture. The capacitor is disposed on a substrate 1 which may comprise, e.g., an insulating material such as sapphire or a suitable plastic such as Lucalox.

Disposed on the substrate 1 is a thin film 2 of chromium. Chromium is employed as the film material because it adheres well to the substrate. The thickness of the chromium layer 2 is approximately 200 Angstroms.

Disposed on the layer 2 is a relatively thick layer 3 of copper. The purpose of the layer 3 is to provide good conductivity to the capacitor electrode 4. The copper layer 3 may have a thickness on the order of 4 microns. The electrode layer 4 comprises a thin film of chromium having a thickness of about 200 Angstroms. The layers 2, 3, and 4 are sequentially deposited by evaporation techniques well known in the art.

Disposed on the chromium electrode layer 4 is a dielectric layer 6 comprising pyrolytically deposited silica. At the interface between the electrode layer 4 and the silica layer 6 is a transition layer 5 consisting of one or more reaction products of chromium, silica, and/or the constituent gases employed during the pyrolytic deposition step. The main constituent of the transition layer 5 is believed to be chromium oxide, $Cr_2O_3$.

Disposed on the dielectric layer 6 is another film of chromium 7 which serves as the other electrode of the capacitor. The chromium film 7 is extremely thin and is deposited as a "flash."

Disposed on the layer 7 is an additional copper layer 8 which is relatively thick and serves to provide good conductivity to the electrode 7. This thickness of the layer 8 is approximately 2 microns. The layers 7 and 8 are deposited by conventional evaporation techniques.

Disposed on selected parts of the layer 8 is a nickel layer 9 which has been electrolytically plated onto the underlying copper layer. A gold layer 10 is electrolytically plated onto the underlying nickel layer 9.

It is thus apparent that the structure of FIGURE 1 comprises a thin film capacitor wherein the silica layer 6 serves as the dielectric, and the adjacent chromium layers 4 and 7 serve as the electrodes to said dielectric. In order to isolate the various capacitors formed on the common substrate 1 and to control the area and thus the capacitance of each such capacitor, it is necessary to remove selected portions of the composite consisting of layers 2 through 8.

Figure 2:
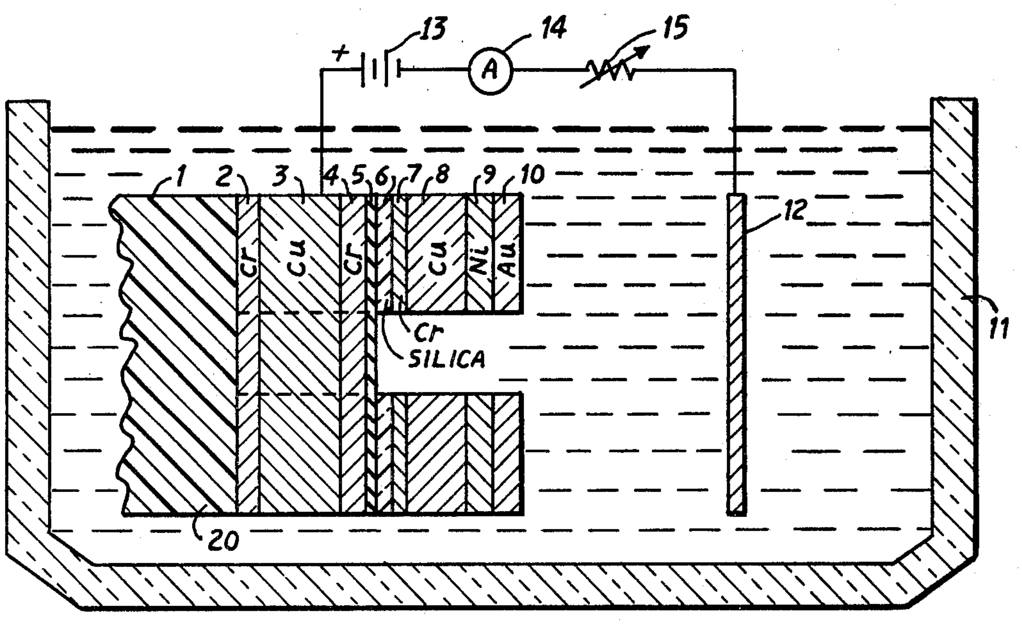
FIGURE 2 shows apparatus employed in practicing the electrolytic etching technique of the invention.

The removal of the selected portions of layers 2–8, represented by the area between the dashed lines in FIGURES 1 and 2, is initiated by selective chemical etching of the copper layer 8. The selectively deposited gold layer 10 acts as an etching mask to protect the underlying portions of the capacitor structure from the etch solution. The structure of FIGURE 1 is initially immersed in a standard ferric chloride copper etch solution such as that sold by Hunts Company. The copper etch removes the exposed portion of the copper layer 8 but does not affect the underlying chromium layer 7.

The chromium layer 7 is removed by a chromium etch solution consisting of 200 grams of 37% (by weight) sodium hydroxide solution and 100 grams potassium ferricyanide, these quantities being added to water to make 1 liter of solution. This chromium etch solution is applied to the now exposed surface of the chromium layer 7 to remove a corresponding portion of said layer.

The underlying portion of the silica layer 6 is next removed by subjecting said portion to a standard buffered hydrofluoric acid etching solution, such as that sold by Transint Corporation. After removal of the underlying silica layer portion, there is exposed the chromium layer 4 and overlying transition layer 5. Application of the aforementioned chromium etch solution is ineffective since the transition layer 5 is highly resistant to said chromium etch. I have found that the transition layer 5 is also highly resistant to other chromium etches such as potassium hydroxide and hydrochloric acid.

The transition layer 5 has been formed as a result of the elevated temperatures and gaseous constituents to which the underlying chromium layer 4 was exposed during the pyrolytic deposition of the silica layer 6. The pyrolytic deposition of said silica layer was carried out by reacting silane ($SiH_4$) and oxygen at a temperature of approximately 450° C. It is believed that at this elevated temperature, the oxygen reacts directly with the chromium to produce chromium oxide which, as previously stated, is believed to be the major constituent of the etch resistant transition layer 5. Since the other chromium layer 7 is evaporated onto the silica dielectric layer 6 at a relatively low temperature, and since gaseous oxygen is not present at this time, no such transition layer is formed between the chromium layer 7 and the underlying silica layer 6.

After etching the layers 8, 7, and 6 to expose the etch resistant transition layer 5, the resultant structure (shown at 20 in FIGURE 2) is immersed in an electrolytic solution comprising dilute sodium hydroxide, as shown in FIGURE 2. The sodium hydroxide electrolyte is prepared by adding sufficient water to 40 grams of 37% (by weight) sodium hydroxide to provide 1 liter of solution.

Also immersed in the electrolytic solution is a steel plate 12 which serves as the cathode electrode for the subsequent electrolytic etching step according to my invention.

As shown in FIGURE 2, both the cathode electrode 12 and the composite structure 20 are immersed in the dilute sodium hydroxide electrolyte which is retained in the glass vessel 11. An electrical connection is made to the steel plate 12 and another electrical connection to the relatively thick copper layer 3 which is in electrical contact with the adjacent chromium electrode layer 4 and thus is coupled to the transition layer 5. While the electrical connection is shown in FIGURE 2 as being made to the copper layer 3, this is done merely as a manner of convenience due to the relatively great thickness of said copper layer. Other suitable techniques may be employed to contact the chromium layer 4 directly or in some manner make electrical connection directly to the transition layer 5.

Connected in series between the copper layer 3 and the cathode electrode 12 are a battery or source of unidirectional potential 13, an ammeter 14, and a rheostat 15. The battery 13 is poled so as to make the transition layer 5 and electrically coupled layers 3 and 4 positive with respect to the cathode element 12 and consequently with respect to the electrolyte solution itself. The battery potential difference should preferably lie between 3 and 5 volts. The rheostat 15 is adjusted so as to provide a reading on the ammeter 14 corresponding to a current density at the exposed surface of the transition layer 5 on the order of 0.5 ampere/sq. inch. I have found that a current density substantially greater than this value serves to erode the transition layer 5 too rapidly causing undercutting of the adjacent portions of the capacitor structure which are desired to be retained. A value of current density which is lower than this value substantially increases the electrolytic etching time required.

Figure 3:
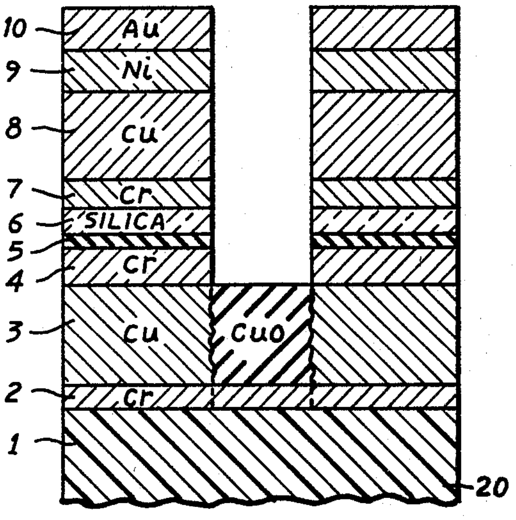
FIGURE 3 shows the resultant structure of the thin film capacitor of FIGURE 1 immediately after removal from the electrolytic solution of FIGURE 2.

At a current density on the order of 0.5 ampere/sq. inch, the required electrolytic etching time is approximately 15 seconds. During this time, the portion of the transition layer 5 which is exposed is removed, as well as the underlying portion of the chromium electrode layer 4. The corresponding underlying portion of the copper layer 3 is converted to cupric oxide (CuO) by the action of the electrolytic etching solution. The resultant structure is shown in FIGURE 3. The cupric oxide is removed by immersing the composite structure in the aforementioned copper etch, and the underlying portion of the chromium layer 2 is removed by subsequently immersing the structure in the aforementioned chromium etch.

It is to be noted that the electrolytic etching step of my invention serves to remove not only the selected portion of the transition layer 5 but also the underlying portion of the chromium electrode layer 4 in a single process operation, thus eliminating the need for an additional chromium chemical etching step.

What is claimed is:

1. In a process comprising the steps of (a) successively depositing first and second contiguous layers comprising chromium and silica respectively to form a laminate, said silica being deposited by reacting silane ($SiH_4$) and oxygen at a temperature of about 450° C., said layers interacting at the interface therebetween to form a transition layer comprising chromium oxide and other chromium compounds; and (b) removing a selected portion of said laminate, the improvement wherein said removing step includes:

removing a corresponding portion of a given one of said first and second layers to expose the underlying portion of said transition layer;

subsequently immersing said laminate in an electrolytic solution comprising dilute sodium hydroxide and applying a potential difference between said solution and said transition layer to electrolytically remove said underlying transition layer portion; and removing the corresponding portion of the other of said first and second layers beneath said underlying portion.

2. The improvement according to claim 1, wherein said chromium layer is removed electrolytically while said laminate is immersed in said electrolyte and subjected to said potential difference.

3. The improvement according to claim 2, wherein said sodium hydroxide solution is obtained by combining 40 grams of 37% (by weight) sodium hydroxide with sufficient water to provide one liter of said solution.

4. The improvement according to claim 3, wherein said potential difference is between 3 and 5 volts.

5. The improvement according to claim 4, wherein the current density at the surface of said exposed transition layer portion during said transition layer portion removal step is on the order of 0.5 ampere/sq. inch.

6. The improvement according to claim 5, wherein said potential difference is applied for a time on the order of 15 seconds.

7. The improvement according to claim 1, wherein said silica layer is pyrolytically deposited on said chromium layer by the vapor phase reaction of silane and oxygen.

8. The improvement according to claim 1, wherein a protective film overlies at least a part of the surface of said chromium layer during said electrolytic removal step.

References Cited

UNITED STATES PATENTS

| | | | |
|---|---|---|---|
| 3,267,013 | 8/1966 | Mathias et al. | 204—146 |
| 3,108,931 | 8/1963 | Wendell | 204—143 |

JOHN H. MACK, Primary Examiner

S. KANTER, Assistant Examiner